United States Patent
Desurvire

(10) Patent No.: US 6,931,213 B2
(45) Date of Patent: Aug. 16, 2005

(54) REGENERATOR FOR A WAVELENGTH DIVISION MULTIPLEX TRANSMISSION SYSTEM

(75) Inventor: Emmanuel Desurvire, Bruyeres le Chatel (FR)

(73) Assignee: Alcatel, Paris (FR)

(*) Notice: Subject to any disclaimer, the term of this patent is extended or adjusted under 35 U.S.C. 154(b) by 445 days.

(21) Appl. No.: 09/768,153

(22) Filed: Jan. 24, 2001

(65) Prior Publication Data

US 2001/0021048 A1 Sep. 13, 2001

(30) Foreign Application Priority Data

Feb. 21, 2000 (FR) .............................................. 00 02089

(51) Int. Cl.[7] .......................... H04B 10/02; H04B 10/12; H04B 10/16; H04B 10/20; H04J 14/02
(52) U.S. Cl. ......................... 398/175; 398/79; 398/93; 398/155
(58) Field of Search .............................. 398/79, 93, 97, 398/154, 155, 176, 175; 359/237, 279, 337.11, 337.12, 341.4, 349

(56) References Cited

U.S. PATENT DOCUMENTS

| | | | |
|---|---|---|---|
| 5,864,414 A | 1/1999 | Barnsley et al. | |
| 5,938,309 A | 8/1999 | Taylor | |
| 6,078,601 A | * | 6/2000 | Smith .................... 372/29.014 |
| 6,323,979 B1 | * | 11/2001 | Bigo .......................... 398/146 |
| 6,337,755 B1 | * | 1/2002 | Cao ............................. 398/97 |
| 6,347,128 B1 | * | 2/2002 | Ransijn ...................... 375/376 |

OTHER PUBLICATIONS

Leclerc, O, et al.: "Dense WDM (0.27 bit/s/Hz) 4*40 Gbit/s dispersion–managed transmission over 10000 km with in–line optical regeneration by channel pairs" Electronics Letters, Feb. 17, 2000, IEE, UK, vol. 36, No. 4, pp. 337–338, XP002151979.

* cited by examiner

Primary Examiner—Jason Chan
Assistant Examiner—Nathan Curs
(74) Attorney, Agent, or Firm—Sughrue Mion, PLLC

(57) ABSTRACT

The invention relates to wavelength division multiplex fiber optic transmission systems. It proposes a regenerator including a demultiplexer for separating the signals of various channels, a plurality of optical modulators each receiving signals from the demultiplexer and a modulation clock from a clock distribution unit, and a multiplexer combining the signals modulated by the modulators. The clock distribution unit includes a reference clock and, for each modulator, means for synchronizing the phase of a copy of the reference clock with the signals applied to the modulator. A phase-locked loop can be used for phase synchronization, with a phase shifter controlled in accordance with the average power of the signals at the output of the modulator. The invention enables only low-frequency components to be used to generate modulation clocks from a single reference clock.

15 Claims, 1 Drawing Sheet

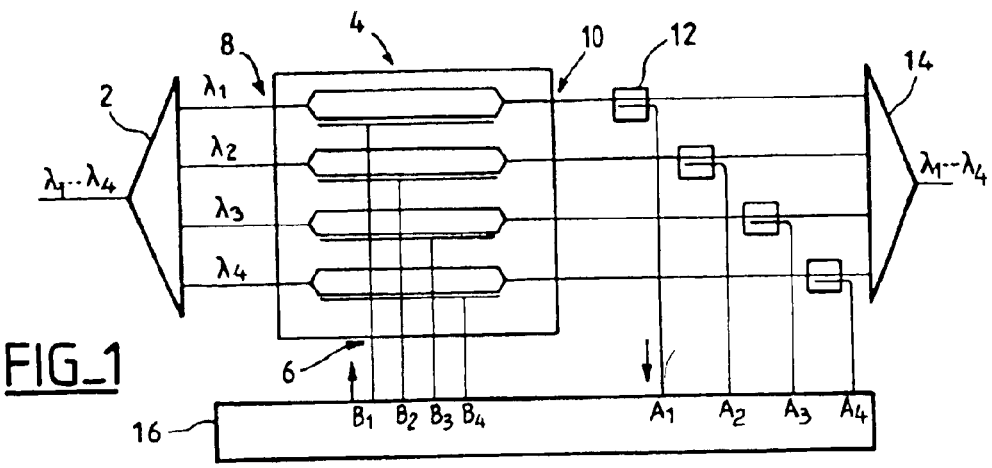
FIG_1
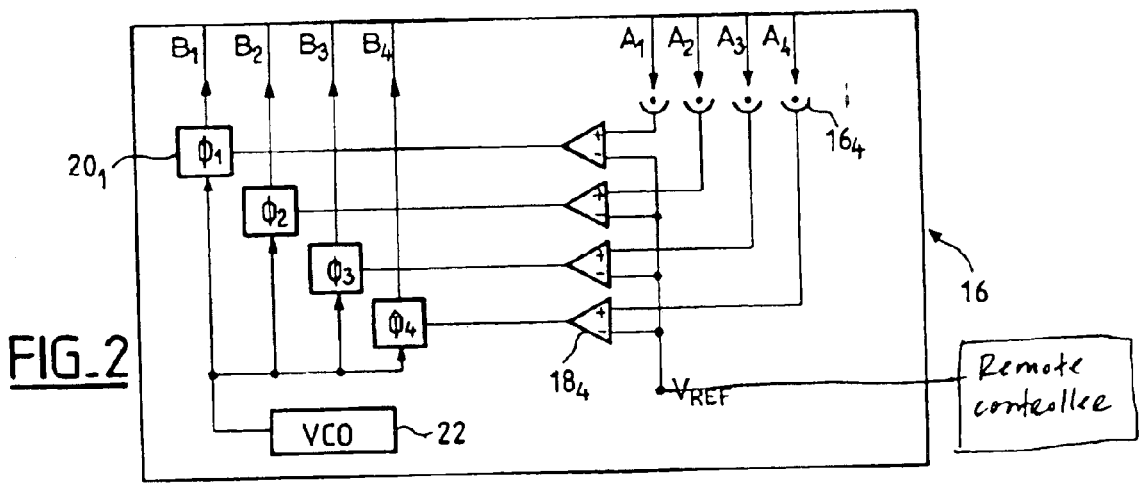
FIG_2
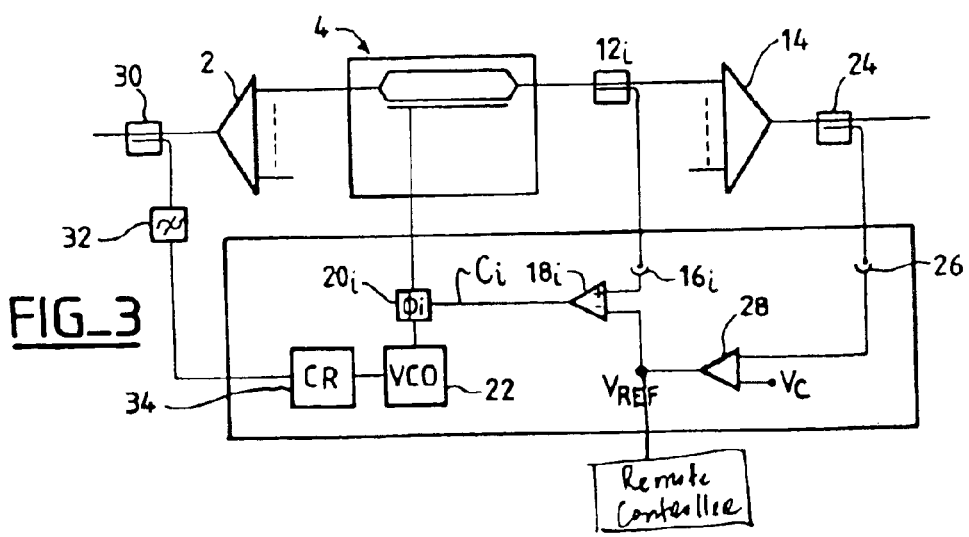
FIG_3

REGENERATOR FOR A WAVELENGTH DIVISION MULTIPLEX TRANSMISSION SYSTEM

The invention relates to wavelength division multiplex fiber optic transmission systems and more precisely to regenerating signals by optical modulation in wavelength division multiplex fiber optic transmission systems.

BACKGROUND OF THE INVENTION

It has been proposed to make regular use in wavelength division multiplex fiber optic transmission systems of periodic regeneration of signals by synchronous modulation. The modulation is preferably optical, especially in high bit rate systems. The problem then arises of group velocity differences between the channels due to the differences between the wavelengths and the dispersion of the line optical fibers. The group velocity differences desynchronize the bit times of the various channels and prevent simultaneous synchronous modulation of the channels of the multiplex.

A first solution to the problem is to separate the various channels before using synchronous modulation to regenerate each channel. The regenerated channels can then be multiplexed. A regenerator in that configuration is made up of the same number of synchronous modulators as there are channels, connected in parallel. Because the channels are not synchronized each regenerator has its own clock recovery circuit. That solution is bulky, costly and has a high power consumption because of the number of electronic circuits to be replicated for clock recovery.

French Patent Application 99 02 126 filed on Feb. 2, 1999 (Fo. 102078) proposes to regenerate only a subset of channels in a regenerator, for example one channel in four. All channels are processed downstream of a plurality of regenerators, four regenerators in that example. That solution reduces the number of modulators to be connected in parallel in each regenerator, by a factor of four in that example. For the same performance, the total number of modulators in the transmission system remains the same. That solution simplifies the structure of a regenerator but has no effect on cost or power consumption.

Other solutions to the problem of synchronous regeneration entail synchronizing the various channels periodically in order to regenerate the channels simultaneously at the point of synchronicity. An article by E. Desurvire, O. Leclerc and O. Audouin entitled "Synchronous in-line regeneration of wavelength division multiplexed solitons signals in optical fibers", Optics Letters, vol. 21, no. 14, pages 1026–1028, describes a scheme for allocating wavelengths that is compatible with the use of synchronous modulators for soliton signals. The article proposes allocating wavelengths to the various channels of the multiplex so that, for given intervals $Z_R$ between repeaters, the signals of the various channels, or to be more precise the bit times of the various channels, of the multiplex are substantially synchronized on reaching the repeaters. That enables in-line synchronous modulation of all channels at given intervals using discrete synchronous modulators. That technique of allocating the wavelengths of the multiplex is also described in French Patent Application FR-A-2 743 964 in the name of Alcatel Submarine Networks. The article proposes choosing a sub-group of channels that are synchronous not only with intervals $Z_R$ but also with intervals which are sub-multiples of $Z_R$.

An article by O. Leclerc, E. Desurvire and O. Audouin entitled "Synchronous WDM soliton regeneration: towards 80–160 Gbit/s transoceanic systems", Optical Fiber Technology, 3, pages 97–116 (1997), specifies that the above wavelength allocation scheme can lead to excessively large intervals $Z_R$ between the synchronous modulators or to excessively large spacings between the channels of the multiplex. To alleviate that problem, the article notes that in that kind of wavelength allocation scheme the bit times of the subsets of channels of the multiplex are synchronous with intervals that are sub-multiples of $Z_R$. The article consequently proposes regenerating subsets of channels of the multiplex at smaller intervals. However, that solution imposes filtering of the channels of the subset to be regenerated and the transmission system loses the benefit of a single period for all channels.

FR-A-2 770 001 proposes using a synchronous modulator to modulate the soliton signals of all the channels of a wavelength division multiplex transmission system at a frequency N/T which is a multiple of the clock frequency 1/T of the signals. That loosens the synchronicity constraint by requiring the various channels to be synchronized to a sub-multiple of the bit time, instead of imposing synchronization of the bit times.

FR-A-2 759 516 proposes demultiplexing the various channels and applying the necessary time-delays to them to resynchronize them. After multiplexing, the various channels can be modulated by a single optical modulator. French Patent Application 97 06 590 proposes using a chain of gratings formed in a fiber to apply suitable time-delays and thereby resynchronize the various channels without having to employ demultiplexing and remultiplexing. An article by M. Nakazawa et al. entitled "160 Gbit/s WDM (20 Gbit/s×8 channels) soliton transmission over 10 000 km using in-line synchronous modulation and optical filtering", Electronics Letters, vol. 34, no. 1 (1998), pp. 103–104, proposes resynchronizing the channels of a wavelength division multiplex using a different dispersion compensating fiber (DCF) for each channel. The article proposes using four modulators to regenerate eight channels, three of the modulators processing two channels simultaneously.

The above solutions have the following drawbacks. The passive solutions (choice of wavelengths or application of fixed time-delays) have the drawback of high sensitivity to the characteristics of the transmission system and in particular to dispersion, temperature, and regenerator positioning. There is additionally the problem of aging of the systems and that of correlated variations in the above characteristics.

OBJECTS AND SUMMARY OF THE INVENTION

The invention proposes a solution to the problem of regenerating channels of wavelength division multiplex transmission systems. It reduces the cost and power consumption of the regenerators without imposing any constraint on the choice of wavelengths.

To be more precise, the invention proposes a regenerator for a wavelength division multiplex transmission system, including a demultiplexer adapted to separate the signals of various channels, a plurality of optical modulators each adapted to receive signals from the demultiplexer and a modulation clock from a clock distribution unit, and a multiplexer adapted to combine the signals modulated by said modulators, in which regenerator the clock distribution unit includes a reference clock and, for each modulator, means for synchronizing the phase of a copy of the reference clock with the signals applied to the modulator.

In one embodiment, the phase synchronization means include a phase-locked loop for each modulator.

In this case the phase-locked loop includes a phase shifter receiving a copy of the reference clock and supplying a modulation clock and the phase shifter is controlled in accordance with the average power of the output signals of the modulator.

The phase-locked loop preferably includes a coupler adapted to sample a portion of the output signals of the modulator and a photodiode adapted to receive the signals from the coupler and to supply a voltage representative of the average power of the output signals of the modulator.

In this case the phase shifter is controlled by a signal that is a function of the difference between said voltage and a reference voltage.

The reference voltage can depend on the total power of the signals at the output of the regenerator or can be remote-controlled.

In another embodiment of the invention, the reference clock is supplied by a voltage-controlled oscillator. In particular, it can be controlled as a function of the signals applied to the regenerator.

In a further embodiment the regenerator includes a coupler for sampling a portion of the input signals of the regenerator and a clock recovery circuit adapted to receive signals sampled by the coupler and to supply at its output a control signal for the oscillator.

BRIEF DESCRIPTION OF THE DRAWINGS

Other features and advantages of the invention will become apparent on reading the following description of embodiments of the invention, given by way of example and with reference to the accompanying drawings, in which:

FIG. 1 is a diagram showing a regenerator of the invention;

FIG. 2 is a diagram showing a clock distribution unit of the regenerator shown in FIG. 1; and FIG. 3 is a diagram showing a different embodiment of the clock distribution unit of the regenerator shown in FIG. 1.

MORE DETAILED DESCRIPTION

To reduce the volume, cost, and complexity of regenerators, the invention proposes sharing a common clock distribution unit between the synchronous modulators. The clock distribution unit has a reference clock which is replicated to provide as many copies as necessary. Each copy is synchronized in phase with one channel. A phase-locked loop can be used to synchronize the phase of the copies of the reference clock and the corresponding channels.

The remainder of the description refers to an embodiment of a regenerator in a transmission system with four channels. The invention is not limited to this number of channels, of course. In the example, the four channels are modulated separately. The invention applies equally well to the situation described in the M. Nakazawa article in which some channels are modulated by the same modulator.

FIG. 1 is a diagram showing a regenerator of the invention. The regenerator includes a demultiplexer 2 which receives the multiplexed signals of the various channels at its input and supplies the separated channels at its output. The channels supplied at the output of the multiplexer are applied to a set of optical modulators. The various modulators can be combined on a single InP chip 4. This is known in the art. The chip has clock inputs 6 which receive the clocks for modulating the various channels, inputs 8 which receive the signals of the separated channels from the demultiplexer 2, and outputs 10 which supply the signals of the various channels modulated by the clocks. A coupler $12_i$ at the output of the modulators of each channel samples a portion of the modulated signals. The modulated signals are then combined in a multiplexer 14.

The regenerator also includes a clock distribution unit 16 which receives signals $A_i$ sampled at the output of the modulator of each channel and supplies clocks $B_i$ to each modulator. In the invention, the clock $B_i$ for a channel $\lambda_i$ is obtained by locking the phase of a reference clock on the basis of the signal sampled at the modulator output for the channel in question.

The FIG. 1 regenerator operates as follows. The signals of the various channels are separated in the demultiplexer 2, modulated by respective modulators and then recombined in the multiplexer 14. The clock distribution unit supplies the clocks needed for modulation. The operation of the clock distribution unit is described in more detail hereinafter.

The invention enables sharing of the clock distribution unit and avoids the multiplicity of circuits used in prior art regenerators. The regenerator also locks the phase of the modulation clocks for each channel independently of variations in the phase of the various channels on transmission. The regenerator is also insensitive to output power variations, due in particular to location in the transmission system, equipment failures or interruptions of transmission on the various channels.

FIG. 2 is a diagram showing the clock distribution unit of the FIG. 1 regenerator. As indicated with reference to that figure, the distribution unit receives signals $A_i$ sampled downstream of the modulators and supplies clocks $B_i$. The signals sampled downstream of the modulators are fed to low-frequency photodiodes $16_i$ which supply respective voltages representative of the average power of the modulated signal of each channel. In the expression "low-frequency photodiode", the term "low-frequency" refers to frequencies below the frequency of the signals transmitted. Signals at 10 Gbit/s on each channel are typically considered in this example. The photodiode can be a photodiode whose frequency response levels off at a few tens or hundreds of kHz. A photodiode therefore supplies a signal whose power is representative of the average power of the modulated signal of a channel over a window with a length of the order of a few tens of thousands or a few millions of bits.

The voltage supplied by each photodiode is applied to the non-inverting input of a low-frequency amplifier $18_i$ which is configured as a comparator. In the expression "low-frequency amplifier", the term "low-frequency" means, as with the photodiodes, that the frequency response of the amplifier levels off at a few tens or hundreds of kHz, for example. Each amplifier receives a reference voltage $V_{REF}$ at its inverting input and supplies at its output a voltage $C_i$ representative of the difference between the output voltage of the photodiode and the reference voltage.

The output voltage of each amplifier $18_i$ is fed to a control input of a phase controller $20_i$ shown in the figure as a phase shifter $\Phi_i$. Phase controllers or shifters of this kind are commercially available or can be implemented using various types of generic electronic circuit: analogue/digital, hybrid/integrated, etc. Each phase controller also receives a reference clock and supplies at its output a clock $B_i$ derived from the reference clock and whose phase depends on the voltage applied to its control input. In the FIG. 2 embodiment, the reference clock is supplied by a voltage-controlled oscillator (VCO) 22. The clock is adjusted to the frequency of the signals transmitted on each channel, which is 10 GHz in this example. The reference clock can be adjusted by varying the voltage applied to the oscillator, either at installation time or in use. FIG. 3 shows a clock recovery circuit for adjusting the voltage applied to the oscillator.

The FIG. 2 clock generation unit operates as follows: the phase of the reference clock applied to each phase controller $20_i$ is adjusted in the phase-locked loop formed by the phase controller $20_i$, the modulator, the photodiode $16_i$ and the amplifier $18_i$. For a given channel, the operation of the phase-locked loop is based on the fact that the average power of the modulated signal is at a maximum when the modulation clock $B_i$ is in phase with the signal. The output voltage of the photodiode $16_i$ varies between a minimum value for a phase difference of $\pi$ between the modulation clock and the signals to be modulated and a maximum value when the modulation clock and the signals to be modulated are in phase. The ratio between the minimum value and the maximum value depends on the chosen depth of modulation, a phase difference of $\pi$ "crushing" the pulses by an amount equal to the modulation depth. The maximum value depends on the proportion of "0" and "1" bits in the signals to be modulated and on the characteristics of the photodiodes. As explained in more detail below, the reference voltage $V_{REF}$ is preferably equal to this maximum value.

Accordingly, for a random value of the phase of the control signal $B_i$, the output of the modulator has an average power which depends on the phase and the output voltage of the photodiode and is between zero and the reference voltage $V_{REF}$. If the output voltage of the photodiode is zero, the differential voltage supplied by the amplifier $18_i$ is non-zero and the phase controller $20_i$ therefore varies the phase of the clock $B_i$. When the phase of the clock $B_i$ approaches the phase of the signals to be modulated, the voltage supplied by the photodiode approaches the reference voltage $V_{REF}$ and the control voltage applied to the phase controller $20_i$ approaches zero. The loop therefore locks the phase of the clock $B_i$ to the phase of the signals to be modulated in the corresponding channel.

The use of low-frequency components (photodiodes and differential amplifiers) limits the cost of the clock distribution unit of the invention. Less costly ordinary electronic components can be used. In particular, it is not necessary to use in the FIGS. 1 and 2 embodiment a high-speed photodiode, i.e. a device that is capable of supplying a signal varying substantially with the frequency of the signals transmitted. The clock distribution unit can be implemented on a single microchip by integrating components (photodiodes, amplifiers, phase controllers) using Si or S—Ge technology.

As indicated above, the reference voltage $V_{REF}$ is preferably equal to the maximum voltage supplied by the photodiode when the clock for the corresponding channel is in phase with the signals to be modulated. Small variations between the maximum voltage of the photodiodes and the reference voltage are acceptable, however. Such errors can also be corrected by generic control devices that are more complex than the solution proposed hereinafter, in particular through coupling with supervisory signals. In this case, the reference voltage could be remote-controlled in accordance with the results of supervision. This solution enables adjustment of the reference voltage in accordance with power fluctuations or imperfections of the device.

A solution for equalizing the maximum voltage supplied by the photodiodes and the reference voltage consists of slaving the reference voltage to the average voltage of the modulated signals, as explained with reference to FIG. 3, which is a diagram showing a different embodiment of the clock distribution unit. FIG. 3 shows, for only one channel, the components already described with reference to FIGS. 1 and 2. In this embodiment, the regenerator includes a coupler 24 which samples a portion of the modulated signals at the output of the multiplexer 14. The signals are applied to a low-frequency photodiode 26 of the same kind as the photodiode $16_i$ and which supplies a voltage representative of the average power of the signals of the various channels. That voltage is applied to a voltage divider 28 which also receives a control voltage $V_c$ and supplies at its output a voltage representative of the average power of the signals in a channel. The division ratio of the voltage divider 28 depends on the number of channels. The control voltage $V_c$ can advantageously be remote-controlled. It is then possible to compensate remotely for variations in the number of channels, for example in the event of interruption of transmission on a channel for repairs or following an incident.

A feedback loop could also be used to adjust the reference voltage, having a time constant greater than the phase-locked loop used to adjust the phases of the modulation clocks so as to be sure that the reference voltage remains substantially constant even if the phases of the clocks vary in time.

FIG. 3 also shows an embodiment in which the regenerator further includes clock recovery means. The regenerator includes upstream of the demultiplexer 2 a coupler 30 for sampling a portion of the multiplexed signals. The sampled signals are fed to an optical filter 32 which filters out the signals of a reference channel. The filtered signals are applied to a clock recovery circuit 34 which supplies at its output a signal representative of the clock frequency of the reference channel. That signal can be used to control the voltage-controlled oscillator. The clock recovery circuit could also be used instead of an oscillator, supplying the reference clock directly and taking as its own reference an optical signal sampled in the multiplex.

The regenerator of the invention applies to all wavelength division multiplex transmission systems. It regenerates channels optically, without the constraints of prior synchronization, and without increasing the number of components needed to generate the various modulation clocks.

Of course, the present invention is not limited to the examples and embodiments described and shown, but is open to many variants that will be evident to the skilled person. The examples consider the simplest case, in which the channels are modulated separately. As mentioned above, some modulators or all the modulators could modulate more than one channel. Solutions other than a voltage-controlled oscillator can be used to generate the reference clock, for example a fixed-frequency oscillator or the output of a clock recovery circuit slaved to a reference channel extracted from the multiplex. Nor does the figure show components such as filters or amplifiers that can be added to a regenerator.

What is claimed is:

1. A regenerator for a wavelength division multiplex transmission system comprising:
   a demultiplexer adapted to separate the signals of various channels;
   a clock distribution unit;
   a plurality of optical modulators each adapted to receive signals from the demultiplexer and a modulation clock from the same clock distribution unit; and
   a multiplexer adapted to combine the signals modulated by said modulators, wherein the clock distribution unit comprising:
  a reference clock; and
  for each modulator, means for synchronizing the phase of a copy of the reference clock with the signals applied to the modulator.

2. The regenerator of claim 1, wherein the phase synchronization means comprises a phase-locked loop for each modulator.

3. The regenerator of claim 2, wherein the phase-locked loop comprises a phase shifter receiving a copy of the reference clock and the phase shifter is controlled in accordance with the average power of the output signals of the modulator.

4. The regenerator of claim 3, wherein the phase-locked loop comprises a coupler adapted to sample a portion of the output signals of the modulator and a photodiode adapted to receive the signals from the coupler and to supply a voltage representative of the average power of the output signals of the modulator.

5. The regenerator of claim 4, wherein the phase shifter is controlled by a signal in accordance with the difference between said voltage and a reference voltage.

6. The regenerator of claim 5, wherein the reference voltage depends on the total power of the signals at the output of the regenerator.

7. The regenerator of claim 5, wherein the reference voltage is remote-controlled.

8. The regenerator of claim 1, wherein the reference clock is supplied by a voltage-controlled oscillator.

9. The regenerator of claim 8, wherein the oscillator is controlled in accordance with the signals applied to the regenerator.

10. The regenerator of claim 8, further comprising:
  a coupler for sampling a portion of the input signals of the regenerator; and
  a clock recovery circuit adapted to receive signals sampled by the coupler and to supply at its output a control signal for the oscillator.

11. A wavelength division multiplex transmission system comprising a regenerator according to claim 1.

12. A regenerator according to claim 1, wherein the plurality of optical modulators directly receive signals from the demultiplexer.

13. A regenerator according to claim 2, wherein said phase-locked loop comprises:
  a phase controller;
  a photodiode; and
  an amplifier.

14. A regenerator for a wavelength division multiplex transmission system comprising:
  a demultiplexer adapted to separate the signals of various channels;
  a clock distribution unit;
  a plurality of optical modulators each adapted to receive signals from the demultiplexer and a modulation clock from the clock distribution unit; and
  a multiplexer adapted to combine the signals modulated by said modulators,
  wherein the clock distribution unit comprises:
    a reference clock; and,
    for each modulator, means for synchronizing the phase of a copy of he reference clock with the signals applied to the modulator.

15. A regenerator for a wavelength division multiplex transmission system comprising:
  a demultiplexer adapted to separate the signals of various channels;
  only one clock distribution unit;
  a plurality of optical modulators each adapted to receive signals from the demultiplexer and a modulation clock from the only one clock distribution unit; and
  a multiplexer adapted to combine the signals modulated by said modulators,
  wherein the clock distribution unit comprises:
    a reference clock; and,
    for each modulator, means for synchronizing the phase of a copy of the reference clock with the signals applied to the modulator.

* * * * *